(12) United States Patent
Chen et al.

(10) Patent No.: US 10,368,392 B2
(45) Date of Patent: Jul. 30, 2019

(54) WIRELESS SENSOR NETWORK ARCHITECTURE BASED ON MULTIFUNCTIONAL AND COMPOUND SENSORS

(71) Applicants: BEIJING INSTITUTE OF INFORMATION TECHNOLOGY, Beijing (CN); SHANGHAI INSTITUTE OF MICROSYSTEM AND INFORMATION TECHNOLOGY, CHINESE ACADEMY OF SCIENCES, Shanghai (CN)

(72) Inventors: Yuhong Chen, Shanghai (CN); Xiaobing Yuan, Shanghai (CN); Shicheng Wang, Shanghai (CN); Tingting Liang, Shanghai (CN); Huawei Liu, Shanghai (CN)

(73) Assignees: BEIJING INSTITUTE OF INFORMATION TECHNOLOGY, Beijing (CN); SHANGHAI INSTITUTE OF MICROSYSTEM AND INFORMATION TECHNOLOGY, CHINESE ACADEMY OF SCIENCES, Shanghai (CN)

( * ) Notice: Subject to any disclaimer, the term of this patent is extended or adjusted under 35 U.S.C. 154(b) by 135 days.

(21) Appl. No.: 15/511,802

(22) PCT Filed: Oct. 30, 2014

(86) PCT No.: PCT/CN2014/089853
§ 371 (c)(1),
(2) Date: Aug. 21, 2017

(87) PCT Pub. No.: WO2016/041239
PCT Pub. Date: Mar. 24, 2016

(65) Prior Publication Data
US 2018/0132309 A1 May 10, 2018

(30) Foreign Application Priority Data
Sep. 16, 2014 (CN) .......................... 2014 1 0470218

(51) Int. Cl.
*G01V 1/00* (2006.01)
*G01V 1/22* (2006.01)
(Continued)

(52) U.S. Cl.
CPC .............. *H04W 84/20* (2013.01); *G06F 3/16* (2013.01); *G06K 9/00771* (2013.01);
(Continued)

(58) Field of Classification Search
CPC ..... H04W 8/005; H04W 76/02; H04W 48/18; H04W 4/38; H04W 84/20; G06F 3/16; G06K 9/00771
(Continued)

(56) References Cited

U.S. PATENT DOCUMENTS 7,742,435 B1 * 6/2010 Doherty .............. H04L 12/4625
370/254
8,194,636 B1 * 6/2012 Doherty ................ H04J 3/0652
370/350
(Continued)

FOREIGN PATENT DOCUMENTS

CN 101388130 A 3/2009
CN 101726751 A 6/2010
(Continued)

*Primary Examiner* — Melanie Jagannathan
(74) *Attorney, Agent, or Firm* — Global IP Services; Tianhua Gu

(57) ABSTRACT

A wireless sensor network architecture based on multifunctional and compound sensors comprises several sensing
(Continued)

modules including a plurality of first sensor nodes and a second sensor node. The first sensor nodes are used for collecting a target signal after sensing that a moving target enters a detection area, extracting feature information of the moving target, analyzing the feature information of the moving target to form primary target information, and transmitting the primary target information to the second sensor node, The second sensor node performs moving target matching and association on the primary target information of the moving target that is transmitted by the plurality of first sensor nodes, collects the associated primary target information to form secondary target information. A control module used for synthesizing and calibrating the secondary target information, and obtaining by merging the calibrated secondary target information, the situation evaluation of the moving target to form advanced target information.

9 Claims, 4 Drawing Sheets

(51) Int. Cl.
| | | |
|---|---|---|
| G06F 3/16 | (2006.01) | |
| G06K 9/00 | (2006.01) | |
| G06K 9/62 | (2006.01) | |
| H04N 5/225 | (2006.01) | |
| H04W 84/18 | (2009.01) | |
| H04W 84/20 | (2009.01) | |

(52) U.S. Cl.
CPC ........... *G06K 9/6288* (2013.01); *H04N 5/225* (2013.01); *G01V 1/001* (2013.01); *G01V 1/223* (2013.01); *H04W 84/18* (2013.01)

(58) Field of Classification Search
USPC .................................................. 370/328, 338
See application file for complete search history.

(56) References Cited

U.S. PATENT DOCUMENTS

| | | | | |
|---|---|---|---|---|
| 8,699,406 | B1* | 4/2014 | Charles | H04L 7/048 370/324 |
| 2006/0029060 | A1* | 2/2006 | Pister | H04L 45/02 370/389 |
| 2006/0256959 | A1* | 11/2006 | Hymes | H04M 1/26 379/433.04 |
| 2007/0262863 | A1* | 11/2007 | Aritsuka | H04B 17/27 340/539.22 |
| 2009/0020002 | A1* | 1/2009 | Williams | F41H 13/0025 89/41.03 |
| 2010/0090823 | A1* | 4/2010 | Park | G01S 5/0294 340/539.1 |
| 2011/0098029 | A1* | 4/2011 | Rhoads | G01C 21/3629 455/418 |
| 2012/0089299 | A1* | 4/2012 | Breed | B60C 11/24 701/36 |
| 2013/0201316 | A1* | 8/2013 | Binder | H04L 67/12 348/77 |
| 2013/0335219 | A1* | 12/2013 | Malkowski | G08B 13/22 340/539.22 |
| 2016/0192241 | A1* | 6/2016 | Tseng | H04W 76/14 370/254 |
| 2017/0086054 | A1* | 3/2017 | Azevedo | H04W 4/02 |
| 2018/0146425 | A1* | 5/2018 | Lee | H04W 40/12 |

FOREIGN PATENT DOCUMENTS

| | | |
|---|---|---|
| CN | 202275496 U | 6/2012 |
| CN | 103118391 A | 5/2013 |
| CN | 103476148 A | 12/2013 |

* cited by examiner

WIRELESS SENSOR NETWORK ARCHITECTURE BASED ON MULTIFUNCTIONAL AND COMPOUND SENSORS

CROSS REFERENCE TO RELATED PATENT APPLICATION

The present application is the US national stage of PCT/CN2014/089853 filed on Oct. 30, 2014, which claims the priority of the Chinese patent application No. 201410470218.3 filed on Sep. 16, 2014, which applications are incorporated herein by reference.

BACKGROUND OF THE PRESENT INVENTION

Field of Invention

The present invention belongs to the technical field of wireless sensor networks, relates to a wireless sensor network architecture, and particularly to a wireless sensor network architecture based on multifunctional and compound sensors.

Description of Related Arts

With the rapid development of wireless networks and sensing devices, the types of sensing data are rapidly expanded from the original single data to multimedia information such as audio, video, images and the like, and thereby a wireless sensor network based on a traditional wireless sensor network is produced. Nodes of the wireless sensor network are often equipped with a plurality of sensors having functions such as acquisition, shock sensing, sound sensing, acceleration sensing, temperature sensing, direction sensing and light intensity sensing and the like, these sensors are generally deployed in unmanned environments, are especially used for fulfilling specified tasks in the field and are an energy consumption-sensitive infrastructureless network. Comparing with a traditional wireless sensor network having only a simple environmental data collecting function, a wireless sensor detecting system is capable of sensing richer multimedia information such as audio, video, images and the like, and may realize monitoring for moving target information of fine granular and accurate information, and may be widely applied to fields such as battlefield visualization surveillance, environment monitoring, safety monitoring, traffic monitoring, smart home, medical health and the like.

In the current wireless sensor network, the wireless sensor detecting system generally implements area monitoring, category identification and real-time tracking for a target by way of placing different types of sensor nodes in different places. However, the pieces of target information obtained through these single function nodes are limited, and an attribute and a state of the target cannot be obtained within the nodes, and thus the attribute and the running state of the target can be obtained only by merging a plurality of sensor nodes. In order to ensure operating time of the nodes in the wireless sensor network, bulk data transmission is not suitable. In such a wireless sensor network, decision level merging can only be selected for merging processing of multiple sensors, which will cause loss of a large amount of useful target information at sensor nodes. For merging at a later stage, the loss cannot be made up by an intelligent inference and decision algorithm. In particular, such information loss is lethal under a severe environment. At this time, there is a need for multifunction and compounding of the sensor nodes in the wireless sensor network.

Therefore, how to provide a wireless sensor network architecture based on multifunctional and compound sensors to solve defects in the art such as low accuracy of low-level information merging of the wireless sensor, low robustness and survivability of the wireless sensor network and the like has become a technical problem urgently to be solved by a person skilled in the art.

SUMMARY OF THE PRESENT INVENTION

In view of the above-mentioned defects in the art, an object of the present invention is to provide a wireless sensor network architecture based on multifunctional and compound sensors, in order to solve the problem in the art such as low accuracy of low-level information merging of the wireless sensor, low robustness and survivability of the wireless sensor network.

In order to achieve the above-mentioned object and other related objects, the present invention provides a wireless sensor network architecture based on multifunctional and compound sensors for monitoring a moving target, comprising: several sensing modules, each of the sensing modules comprising a plurality of first sensor nodes and a second sensor node, the plurality of first sensor modes and the second sensor node forming a detection area; wherein the first sensor nodes are used for collecting a target signal of a moving target after sensing that the moving target enters the detection area, pre-processing the target signal, extracting feature information of the moving target, analyzing the feature information of the moving target to form primary target information, and transmitting the primary target information to the second sensor node, and the second sensor node is used for performing moving target matching and association on the primary target information of the moving target that is transmitted by the plurality of first sensor nodes, and correcting the associated primary target information to form secondary target information; a relay transmission module connected with the sensing modules, used for communicating with the second sensor node for receiving the secondary target information; and a control module connected with the relay transmission module, used for receiving the secondary target information transmitted by the second sensor node, synthesizing and calibrating the secondary target information, simultaneously acquiring situation evaluation of the moving target by merging the calibrated secondary target information, and forming advanced target information according to the situation evaluation of the moving target.

Alternatively, the first sensor nodes comprise a shock sensor, a sound sensor, an image sensor, a first information merging unit, a first communication unit and a positioning unit; wherein the shock sensor comprises a shock sensing unit and a shock signal processing unit; a plurality of sound sensors form a multi-element sound array according to a predetermined rule, and the multi-element sound array comprises a multi-element sound sensing unit and a multi-element sound signal processing unit; and the image sensor comprises an image sensing unit and an image information processing unit; the shock sensing unit, the multi-element sound sensing unit and the image sensing unit are used for sensing and collecting a shock signal, a sound signal and image information of the moving target, respectively; the positioning unit is used for acquiring absolute orientation information of a preset reference object within the first sensor nodes; the shock signal processing unit and the multi-element sound signal processing unit are respectively used for, according to the collected shock signal and sound signal, extracting acoustic shock feature information of the moving target, identifying a target category of the moving target, acquiring, according to the multi-element sound array, a relative direction angle of a running direction of the moving target to the preset reference object, and combining the relative direction angle of the running direction of the moving target to the preset reference object and the absolute orientation information of the preset reference object provided by the positioning unit to estimate an actual movement direction of the moving target; and when acquiring the relative direction angle of the running direction of the moving target to the preset reference object, initiating the image sensing unit of the image sensor to acquire a plurality of consecutive frames of images of the moving target, and initiating the image information processing unit of the image sensor to extract multi-dimensional image information of the moving target and to acquire image feature information of the moving target; the first information merging unit is used for merging the acoustic shock feature information, the image feature information, the target category and the actual running direction of the moving target, estimating a running state of the moving target and forming the primary target information; and the first communication unit is used for transmitting the primary target information to the second sensing node.

Alternatively, the first sensor nodes further comprise an environmental information acquiring unit used for sensing environmental and climatic conditions of the moving target and acquiring tilt angle information of the first sensor nodes to determine operating states of the shock sensor and the image sensor, and an energy sensing unit for sensing energy losses of the first sensor nodes; wherein, image quality is judged according to the environmental and climatic conditions acquired by the environmental information acquiring unit.

Alternatively, the second sensor nodes comprise a second communication unit, a second information processing unit and a second information merging unit; wherein the second communication unit is used for receiving the primary target information transmitted by the plurality of first sensor nodes; the second information processing unit is used for converging the primary target information, and performing target matching and association on the converged primary target information, and then correcting a vector state and a covariance for the associated information; the second information merging unit is used for performing space-time merging on the corrected primary target information to form the secondary target information, and enabling the second communication unit to transmit the secondary target information to the control module; wherein the first communication unit and the second communication unit have a function of automatically adjusting its own transmit power.

Alternatively, the second sensor nodes further comprise a second sensing unit used for sensing an energy loss of the second sensor node; and if the sensed energy loss of the second sensor node reaches a depletion threshold, the second sensing unit transmits an instruction for reselecting a second sensor node and enables the first sensor nodes to select a new second sensor node according to a predetermined selection rule.

Alternatively, the control module comprises a third communication unit, a third information merging unit, a third information processing unit, a command and control unit, and a storage unit; wherein, the third communication unit is used for receiving the secondary target information transmitted by the plurality of sensing modules via the relay transmission module; the third information merging unit is used for performing data merging on the received secondary target information; the third information processing unit is used for performing situation analysis and situation prediction on the obtained secondary target information through merging, so as to acquire the advanced target information; the command and control unit is used for sending a command to an operator according to the advanced target information; and the storage unit is used for storing the advanced target information.

Alternatively, the relay transmission module is further used for automatically adjusting its own transmit power.

Alternatively, the wireless sensor network architecture based on multifunctional and compound sensors further comprises an energy conservation management module connected with the plurality of sensing modules and the relay transmission module, wherein the energy conservation management module is used for managing operating modes of the plurality of sensing modules and the relay transmission module to optimize and configure operating states of the first sensor nodes and the second sensor node, and managing a transmit mode of the relay transmission module.

Alternatively, a mesh network structure is adopted between the plurality of first sensor nodes and the second sensor nodes.

As described above, the wireless sensor network architecture based on multifunctional and compound sensors provided in the present invention has the following benefits:

Firstly, by integrating a plurality of types of sensors within a single sensor node in the present invention, a plurality of sensor detecting means are realized, data level merging and feature level merging of a plurality of types of detecting information can be realized within a single sensor, such that primary target information obtained by a low-level sensor is more accurate, thereby the level of confidence of advanced target information in upper level merging processing is increased.

Secondly, by enabling the first sensor nodes and the second sensor node to form a Mesh network structure in the present invention, the reliability of communication between nodes within an area is improved, such that target information obtained by neighboring nodes effectively participates in the merging processing of a current node, thereby a target trajectory is more precise and has continuity at the same time. The feature "the first sensor nodes" and the feature "the second sensor node" can be switched, thereby improving the survivability of the wireless sensor network and prolonging the lifetime of the sensor network through power conservation management and information interaction of the information merging processing unit within the nodes.

Figure 1:
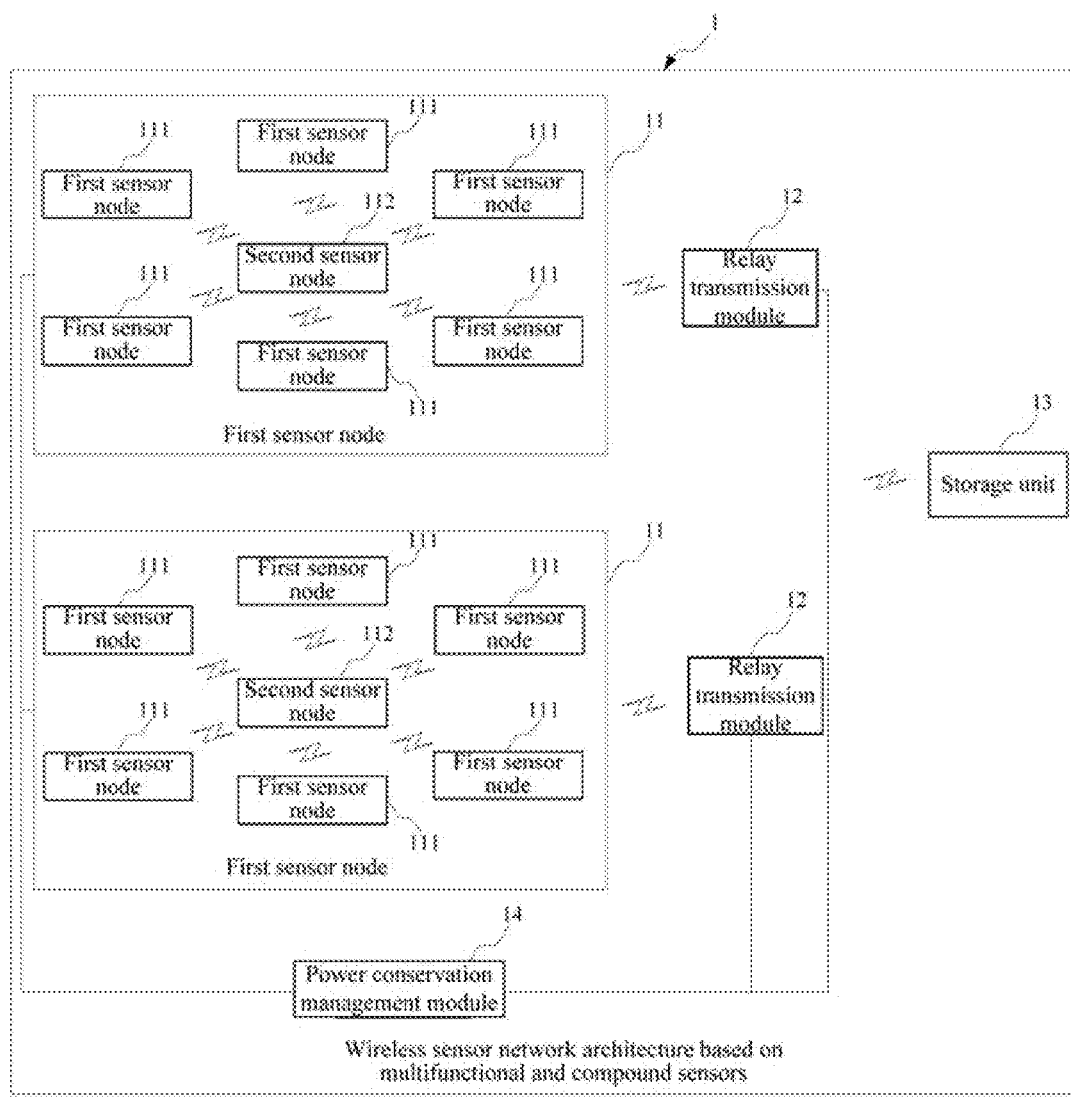
FIG. 1 is a schematic view of principle structure of a wireless sensor network architecture based on multifunctional and compound sensors according to the present invention.

DESCRIPTION OF COMPONENT MARK NUMBERS 1 wireless sensor network architecture based on multifunctional and compound sensors
11 sensing module
111 first sensor node
112 second sensor node
113 detection area
1111 shock sensor
1112 sound sensor
1113 image sensor
1114 positioning unit
1115 first information merging unit
1116 first communication unit
1121 second sensing unit
1122 second communication unit
1123 second information processing unit
1124 second information merging unit
12 relay transmission module
13 control module
131 third communication unit
132 third information merging unit
133 third information processing unit
134 command and control unit
125 storage unit
2 moving target

DETAILED DESCRIPTION OF THE PREFERRED EMBODIMENTS

Hereinafter, implementations of the present invention will be described through specific examples. Those skilled in the art will easily understand other advantages and functions of the present invention from the disclosure of the description. The present invention may also be implemented or applied by other different embodiments, and various details in the description may also be based on different opinions and applications, and various modifications and changes are made without departing from the spirit of the present invention. It needs to be noted that, the following embodiments and features in the embodiments may be combined with each other without conflict.

It needs to be noted that, figures provided in the following embodiments are merely used to illustratively describe basic concepts of the present invention, and therefore the figures only illustrate components related to the present invention rather than being drawn according to the numbers, shapes and sizes of the components during an actual implementation. The patterns, numbers and proportions of various components during the actual implementation may be randomly changed and the layout patterns of the components may also be more complicate.

Embodiment

The present embodiment provides a wireless sensor network architecture 1 based on multifunctional and compound sensors for monitoring a moving target 2. The number of the moving target may be one or more. For example, the moving target may be a person, a vehicle and the like, and in this embodiment, a vehicle is taken as the moving target. As described in the embodiment, referring to FIGS. 1 and 2, there is a diagram of principle structure and a schematic view of an actual application of a wireless sensor network architecture based on multifunctional and compound sensors, wherein the wireless sensor network architecture 1 based on multifunctional and compound sensors comprises several sensing modules 11, a relay transmission module 12, a control module 13 and a power conservation management module 14.

In the embodiment, the number of the sensing modules 11 is two, and the sensing modules 11 comprise a plurality of first sensor nodes 111 and a second sensor node 112, the plurality of first sensor nodes 111 and the second sensor node 112 forming a detection area 113 which is also referred to as a sensing field. Herein, the first sensor nodes 111 are used for collecting a target signal of a moving target after sensing that the moving target enters the detection area, pre-processing the target signal, performing feature extraction on the target information to extract feature information of the moving target, analyzing the feature information of the moving target to form primary target information, and transmitting the primary target information to the second sensor node 112. In the embodiment, the moving target transmits primary target information formed at a first sensor node to the second sensor node 112 every time the moving target passes through the first sensor node. The second sensor node 112 is used for performing moving target matching and association on the primary target information of the moving target that is transmitted by the plurality of first sensor nodes 111, and correcting the associated primary target information to form secondary target information. Internal structures of the first sensor nodes 111 and the second sensor node 112 will be specifically introduced below.

Figure 2:
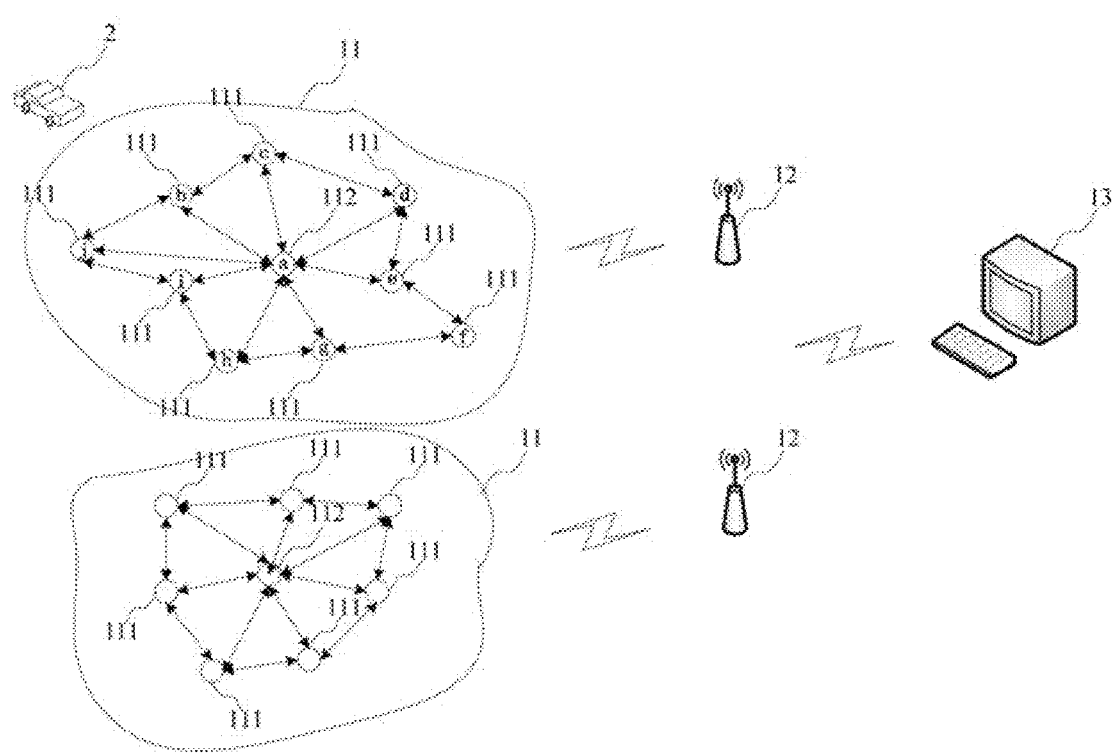
FIG. 2 is a schematic view of an actual application of a wireless sensor network architecture based on multifunctional and compound sensors according to the present invention.
Figure 3:
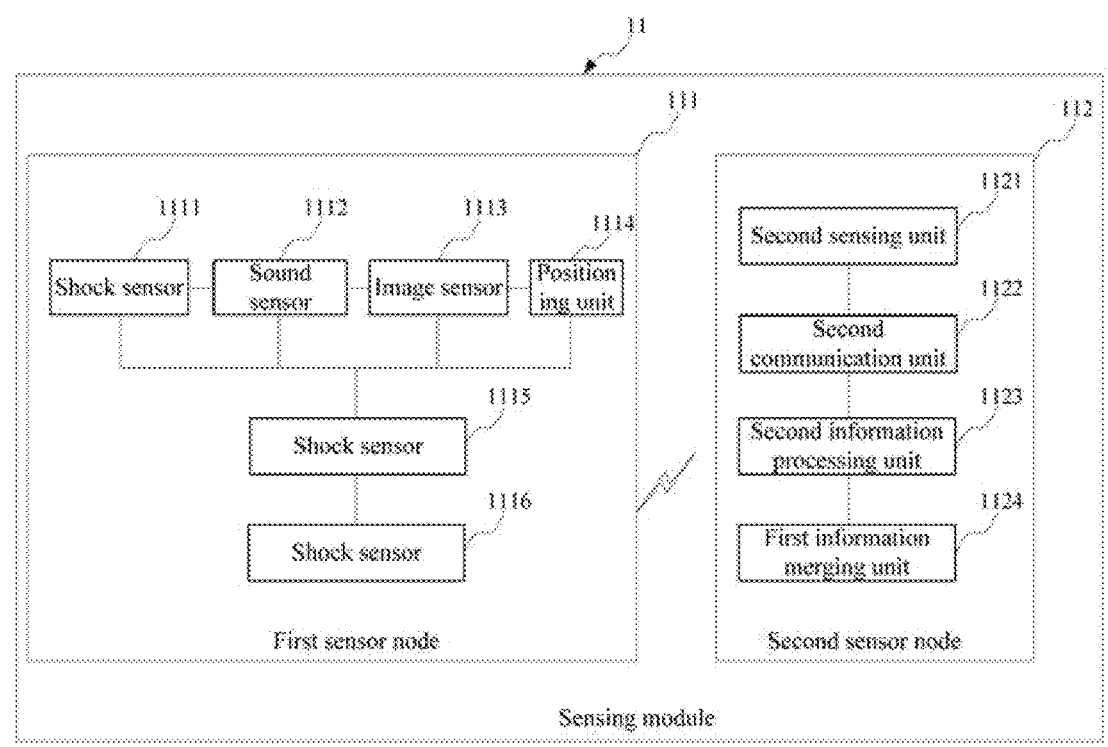
FIG. 3 is a schematic view of principle structure of a sensing module in a wireless sensor network architecture based on multifunctional and compound sensors according to the present invention.

Referring to FIG. 3, there is a schematic view of principle structure of a sensing module. The first sensor nodes 111 comprise a plurality of shock sensors 1111, sound sensors 1112, image sensors 1113, positioning units 114, first information merging units 1115 and first communication units 1116. For simply and clearly describing the diagram of principle structure of the sensing module, FIG. 3 only illustrates one shock sensor 111, sound sensor 1112, image sensor 1113 and positioning unit 1114. In the embodiment, when the moving target enters a first detection area 1113, as shown in FIG. 2, a motion trajectory of the moving target is b→j→i→h, wherein b, c, d, e, f, g, h, i, j represent the first sensor nodes 111, and a represents the second sensor node 112, which is also referred to as a cluster head node. Specific structures and functions of the first sensor nodes 111 will be introduced in detail below.

Herein, the shock sensor 1111 comprises a shock sensing unit and a shock signal processing unit. A plurality of the sound sensors 1112 form a multi-element sound array according to a predetermined rule, a plurality of sound sensors may be arranged in a triangular shape, a circular shape or the like according to the predetermined rule. The multi-element sound array comprises a multi-element sound sensing unit and a multi-element sound signal processing unit. The image sensor comprises an image sensing unit and an image information processing unit. The positioning unit 1114 is used for acquiring absolute orientation information of a preset reference object within the first sensor nodes 111. In the embodiment, the positioning unit 1114 comprises an electronic compass (a compass) and a GPS locator, wherein the electronic compass is used for acquiring absolute orientation information of a preset reference object stored within the first sensor nodes 111 and the GPS locator is used for acquiring geographic location information of the first sensor nodes 111.

The shock sensing unit is used for sensing and collecting a shock signal of the moving target 2. The multi-element sound sensing unit is used for sensing and collecting a sound signal of the moving target 2. The image sensing unit is used for sensing and collecting image information of the moving target 2. The shock signal processing unit and the multi-element sound signal processing unit are respectively used for extracting acoustic shock feature information according to the shock signal and the sound signal that are collected by the shock sensing unit and the multi-element sound sensing unit. That is, the shock signal processing unit and the multi-element sound signal processing unit are used for, according to the shock signal and the sound signal, extracting acoustic shock feature information of the moving target, identifying a target category of the moving target, acquiring, according to the multi-element sound array, a relative direction angle of a running direction of the moving target to the preset reference object (a certain marker in the first sensor nodes 111), and combining the relative direction angle of the running direction of the moving target to the preset reference object and the absolute orientation information, i.e., the geographic location information of the first sensor nodes 1111, of the preset reference object in the first sensor nodes 111 provided by the electronic compass to estimate an actual movement direction of the moving target 2; and when acquiring the relative direction angle of the moving target to the preset reference object, initiating the image sensing unit of the image sensor 1113 to acquire a plurality of consecutive frames of images of the moving target 2, and extracting the plurality of consecutive frames of images through the image information processing unit of the image sensor 113 to acquire multi-dimensional image information of the moving target and to acquire image feature information of the moving target, i.e., information, such as refinement category, speed, distance, number and the like, of the moving target. In the embodiment, a plurality of the image sensors 1113 collect image information of the moving target 2 over 360 degrees. In the embodiment, the first sensor nodes 111 may acquire, according to the feature information of the moving target, the category of the moving target, for example, a vehicle.

The first sensor nodes 111 further comprise an energy sensing unit for sensing energy losses of the first sensor nodes 111 and an environmental information acquiring unit. The environmental information acquiring unit is used for sensing environmental and climatic conditions of the moving target in real time and acquiring tilt angle information of the first sensor nodes 111 to determine operating states of the shock sensor and the image sensor. Herein, the first sensor nodes 111 judge image quality according to the environmental and climatic conditions acquired by the environmental information acquiring unit. For example, in the embodiment, the environmental information acquiring unit comprises an acceleration sensor, a temperature and humidity meter and a light intensity meter. The acceleration sensor may be used for acquiring tilt angle information after the first sensor nodes are arranged, thereby whether the shock sensor, the sound sensor and the image sensor and the like can normally operate can be known, and meanwhile, information of the relative movement direction of the moving target of the multi-element sound array can be corrected. The temperature and humidity meter and the light intensity meter acquire temperature and humidity information and illumination information of environment of the first sensor nodes to thereby acquire image qualities of the plurality of frames of images acquired by the image sensor.

A first information merging unit 1115 which is respectively connected with the plurality of shock sensors 111, sound sensors 1112, image sensors 1113 and positioning units 1114 is used for merging the acoustic shock feature information, the image feature information, the target category and the actual running direction of the moving target which are obtained through analysis and processing by the shock signal processing unit, the multi-element sound signal processing unit and the image information processing unit, estimating a running state of the moving target and forming the primary target information. In the embodiment, the first information merging unit 1115 is further used for calculating a distance from the first sensor nodes 111 to the second sensor node 112, and control a transmit power of the first communication unit 1116 according to the distance from the first sensor nodes 1111 and the second sensor node 112. The first information merging unit 1115 may perform data level merging on original data of the shock sensor 1111 and the sound sensor 1112 to reserve more useful acoustic shock feature information, and then perform feature level merging in combination with the image feature information of the moving target obtained by the image sensor 1113, thereby the object of performing refined classification on the target can be realized and the level of accuracy of intelligence information of a single sensor is improved.

The first communication unit 1116 connected with the first information merging unit 1115 is used for transmitting the primary target information produced by the first information merging unit 1115 to the second sensor node 112. In the embodiment, the first communication unit is a wireless communication unit and the first communication unit 1116 is adapted for short-distance information transmission. In the embodiment, the first communication unit 1116 has a function of automatically adjusting its own transmit power.

In the embodiment, the vehicle is used as an research object for the moving target, and passes through four first sensor nodes 111, i.e., b, j, i, h, respectively. When the moving target travels to the range of a detection area 113 of the first sensor nodes, respective pieces of primary target information will be produced and the produced primary target information about the vehicle is transmitted to the second sensor node 112.

The second sensor node 112 comprises a second sensing unit 1121, a second communication unit 1122, a second information processing unit 1123 and a second information merging unit 1124. Herein, the second communication unit 1121 is used for receiving a plurality of first sensor nodes, i.e., the primary target information transmitted by the first sensor nodes 1111 (b, j, i, h) in the embodiment.

The second sensing unit 1121 is used for sensing an energy loss of the second sensor node 112. If the sensed energy loss of the second sensor node 112 reaches a depletion threshold, the second sensing unit 1121 transmits an instruction for reselecting a second sensor node to the first sensor nodes 111 and enables the plurality of first sensor nodes 111 to select a new second sensor node 112 according to a predetermined selection rule. In the embodiment, the predetermined selection rule comprises choosing a new second sensor node through a selection algorithm or adopting an operation mode in which the first sensor nodes are used to function as the second sensor node in turn, so as to realize charge balance of a plurality of sensor nodes. In an example of an actual application, any algorithm having selection and choosing functions can achieve the object of the present invention and can thus be adopted.

The second information processing unit 1123 connected with the second communication unit 1122 is used for converging the primary target information received by the second communication unit 1122, and performing target matching and association on the converged primary target information, and then correcting a vector state and a covariance for the associated information, to thereby acquiring high-quality high-accuracy state evaluation and keeping continuous tracking of the moving target. In the embodiment, the second communication unit 1122 is also a wireless communication unit. In addition, the second communication unit 1122 is adapted for short-distance and long-distance information transmission. In the embodiment, the second communication unit 1122 has a function of automatically adjusting its own transmit power.

The second information merging unit 1124 connected with the second information processing unit 1123 is used for performing space-time merging on the corrected primary target information to form the secondary target information, and enabling the second communication unit 1122 to transmit the secondary target information to the control module 13.

In the embodiment, a Mesh network structure is adopted between the plurality of first sensor nodes 111 and the second sensor node 112, so that target information sharing between sensor nodes can be effectively realized, association between the information produced by the neighboring nodes and the information produced by the current sensor node is more effectively facilitated, thereby facilitating achieving the continuity of trajectory tracking of the same batch of moving targets. A plurality of routing paths exist between the Mesh network sensor nodes, such that a plurality of connection paths are formed between sensor nodes that are communicated with each other, thereby ensuing stability of information transmission between the nodes. The Mesh network has advantages of a long transmission distance and a large coverage communication area, and is especially suitable for the wireless sensor network operating in a harsh field environment.

As shown in FIG. 2, the relay transmission module 12 is connected with two sensing modules 11, the transmission module 12 is used for communicating with the second sensor node 112 to receive the secondary target information and transmitting the secondary target information to the control module 13. In the embodiment, the transmission module 12 may be a relay transmission device and has a function of automatically adjusting its own transmit power.

Figure 4:
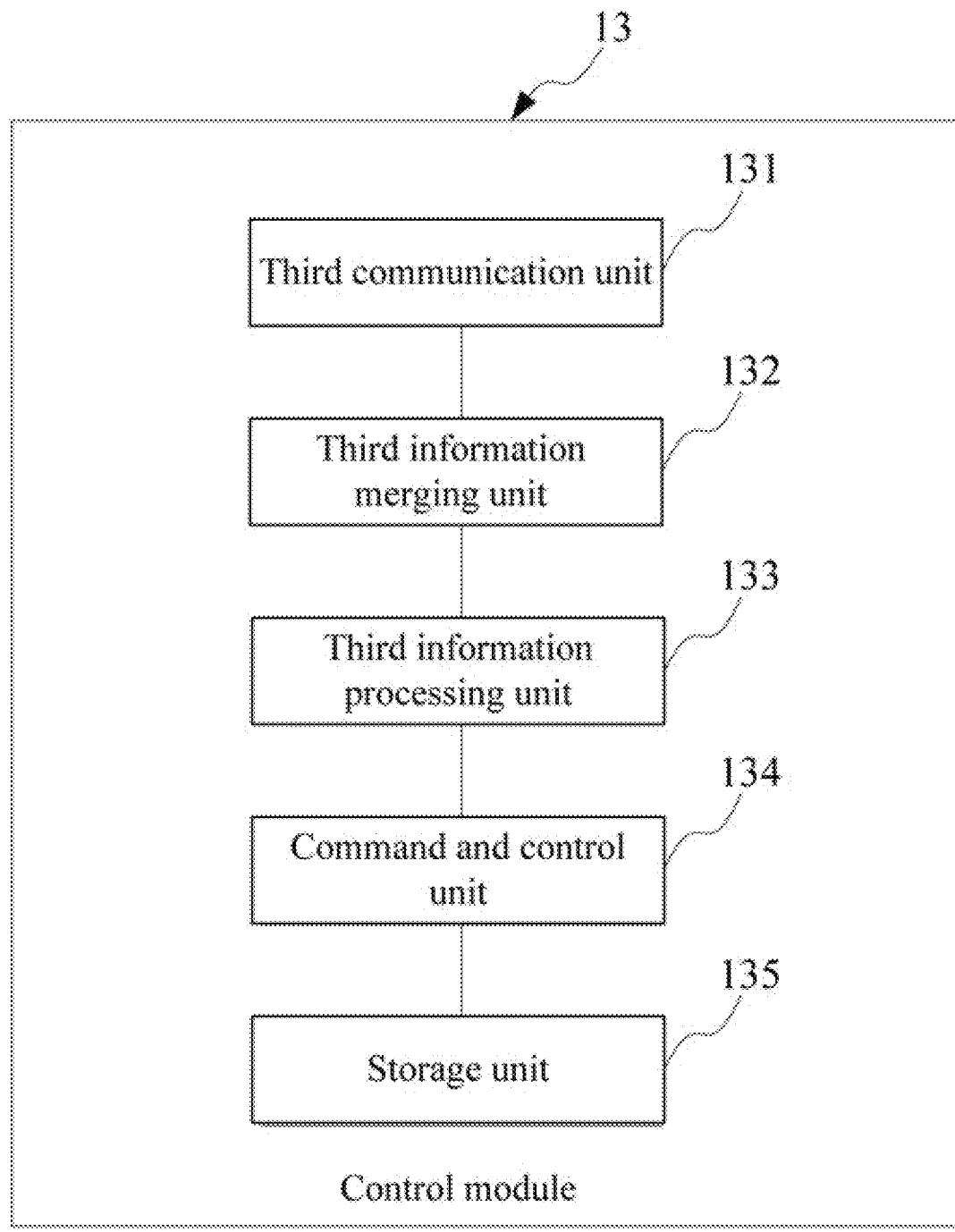
FIG. 4 is a schematic view of principle structure of a control module in a wireless sensor network architecture based on multifunctional and compound sensors according to the present invention.

The control module 13 connected with the relay transmission module 12 is used for receiving the secondary target information transmitted by the second sensor node 112, synthesizing and calibrating the secondary target information, acquiring situation evaluation of the moving target 2 by merging the calibrated secondary target information, and forming advanced target information according to the situation evaluation of the moving target 2. In the embodiment, the control module 13 may be a computer terminal but is not limited thereto. In an example of an actual application, any terminal device having a merging and control function may achieve the object of the present invention, as described herein. Referring to FIG. 4, FIG. 4 illustrates a schematic view of principle structure of a control module. The control module 13 comprises a third communication unit 131, a third information merging unit 132, a third information processing unit 133, a command and control unit 134 and a storage unit 135.

Herein, the third communication unit 131 is used for receiving the secondary target information transmitted by the plurality of sensing modules 11 via the transmission module 12. The third communication unit 131 is adapted for long-distance information transmission.

The third information merging unit 132 connected with the third communication unit 131 is used for performing high-volume multi-level data merging on the received secondary target information to obtain the situation evaluation of the target.

The third information processing unit 133 connected with the third information merging unit 132 is used for performing data calibration, situation analysis and situation prediction of the secondary target information on the obtained secondary target information through merging, in order to acquire the advanced target information. The situation evaluation comprises the situation analysis and the situation prediction of the moving target. The situation analysis comprises entity combination, coordinated processing and coordinated relation analysis, entity distribution and intention of behavior of the moving target, and the like. The situation predication comprises prediction and a distribution situation of geographical locations of the moving target at a future time. The third information processing unit 133 provides a reliable basis for the command and control unit 134 to realize commanding and decision-making.

The command and control unit 134 connected with the third information processing unit 133 is used for sending a command to an operator according to the advanced target information. In the embodiment, the third communication unit 131 will also send the command to the first communication unit 1116 through the second communication unit 1122.

The storage unit 135 connected with the third information processing unit 133 is used for storing the advanced target information, i.e., storing sensed information that is useful.

The wireless sensor network architecture 1 based on multifunctional and compound sensors further comprises an energy conservation management module 14 connected with the plurality of sensing modules and the transmission module, wherein the energy conservation management module 14 is used for managing operating modes of the plurality of sensing modules 11 and the transmission module 12 to optimize and configure operating states of the first sensor nodes 111 and the second sensor node 112, and managing a transmit mode of the transmission module 12. The energy conservation management module 14 is capable of optimizing and configuring senor nodes in an operating state, thereby prolonging the operating time of the wireless sensor network architecture 1 based on multifunctional and compound sensors.

In the embodiment, the target information of the moving target that is acquired by the wireless sensor network architecture based on multifunctional and compound sensors is divided into three levels, i.e., the primary target information, the secondary target information, and the advanced target information. During the data merging, inference logic and decision-making method tend to be intelligent and complicate as the target information level of the moving target is increased.

In the process of comprehensive and multi-level merging of the wireless sensor network architecture based on multifunctional and compound sensors described in the embodiment, first, various units within the "first sensor nodes" of the multifunctional and compound sensors perform acquisition, preprocessing, feature extraction and analysis on the target signal, the merging processing unit within the nodes form the primary target information; second, the obtained primary target information through merging by the "first sensor nodes" is converged to the "second sensor node" for performing target matching and association, and then correction of the vector state and the covariance is performed for the associated data to obtain high-quality high-accuracy state evaluation and keep continuous tracking of the target, in order to form the secondary target information; and finally, the control center performs high-volume multi-level data merging to obtain the situation evaluation and threat evaluation of the moving target, in order to form the advanced target information, and meanwhile, the sensed information that is useful is stored.

To sum up, the wireless sensor network architecture based on multifunctional and compound sensors has the following benefits:

1. By integrating a plurality of types of sensors within a single sensor node in the present invention, a plurality of sensor detecting means are realized, data level merging and feature level merging of a plurality of types of detecting information can be realized within a single sensor, such that primary target information obtained by a low-level sensor is more accurate, thereby the level of confidence of advanced target information in upper level merging processing is increased.

2. By enabling the first sensor nodes and the second sensor node to form a Mesh network structure in the present invention, the reliability of communication between nodes within an area is improved, such that target information obtained by neighboring nodes effectively participates in the merging processing of a current node, thereby a target trajectory is more precise and has continuity at the same time. The feature "the first sensor nodes" and the feature "the second sensor node" can be switched, thereby improving the survivability of the wireless sensor network and prolonging the lifetime of the sensor network through power conservation management and information interaction of the information merging processing unit within the nodes.

Therefore, the present invention effectively overcomes various defects in the prior art and thus has high industrial ty value.

The above-described embodiment is merely used to illustratively describe the principle and function of the present invention and is not used to limit the present invention. Any person skilled in the art may make modifications or changes to the above-described embodiment without departing from the spirit and scope of the present invention. Hence, all equivalent modifications and changes made by those skilled in the art without departing from the spirit and technical concept of the present invention shall be included by the claims of the present invention.

What is claimed is:

1. A wireless sensor network architecture based on multifunctional and compound sensors for monitoring a moving target, characterized by comprising:

a plurality of sensing modules executed by a processor, each of the sensing modules comprising a plurality of first sensor nodes and a second sensor node, the plurality of first sensor modes and the second sensor node forming a detection area; wherein the first sensor nodes are used for collecting a target signal of a moving target after sensing that the moving target enters the detection area, pre-processing the target signal, extracting feature information of the moving target, analyzing the feature information of the moving target to form primary target information, and transmitting the primary target information to the second sensor node, and the second sensor node is used for performing moving target matching and association on the primary target information of the moving target that is transmitted by the plurality of first sensor nodes, and correcting the associated primary target information to form secondary target information;

a relay transmission module executed by the processor connected with the sensing modules, used for communicating with the second sensor node for receiving the secondary target information; and a computer connected with the relay transmission module, used for receiving the secondary target information transmitted by the second sensor node, synthesizing and calibrating the secondary target information, simultaneously acquiring situation evaluation of the moving target by merging the calibrated secondary target information, and forming advanced target information according to the situation evaluation of the moving target.

2. The wireless sensor network architecture based on multifunctional and compound sensors of claim 1, characterized in that, the first sensor nodes comprise a shock sensor, a sound sensor, an image sensor, a first information merging unit, a first communication unit and a positioning unit; wherein the shock sensor comprises a shock sensing unit and a shock signal processing unit; a plurality of sound sensors form a multi-element sound array according to a predetermined rule, and the multi-element sound array comprises a multi-element sound sensing unit and a multi-element sound signal processing unit; and the image sensor comprises an image sensing unit and an image information processing unit;

the shock sensing unit, the multi-element sound sensing unit and the image sensing unit are used for sensing and collecting a shock signal, a sound signal and image information of the moving target, respectively;

the positioning unit is used for acquiring absolute orientation information of a preset reference object within the first sensor nodes;

the shock signal processing unit and the multi-element sound signal processing unit are respectively used for, according to the collected shock signal and sound signal, extracting acoustic shock feature information of the moving target, identifying a target category of the moving target, acquiring, according to the multi-element sound array, a relative direction angle of a running direction of the moving target to the preset reference object, and combining the relative direction angle of the running direction of the moving target to the preset reference object and the absolute orientation information of the preset reference object provided by the positioning unit to estimate an actual movement direction of the moving target; and when acquiring the relative direction angle of the running direction of the moving target to the preset reference object, initiating the image sensing unit of the image sensor to acquire a plurality of consecutive frames of images of the moving target, and initiating the image information processing unit of the image sensor to extract multi-dimensional image information of the moving target and to acquire image feature information of the moving target;

the first information merging unit is used for merging the acoustic shock feature information, the image feature information, the target category and the actual running direction of the moving target, estimating a running state of the moving target and forming the primary target information;

the first communication unit is used for transmitting the primary target information to the second sensing node;

the shock sensing unit, the shock signal processing unit, the multi-element sound sensing unit, the multi-element sound signal processing unit, the image sensing unit, the image information processing unit, the first communication unit, the first information merging unit, and the positioning unit are executed by the processor.

3. The wireless sensor network architecture based on multifunctional and compound sensors of claim 2, characterized in that, the first sensor nodes further comprise an environmental information acquiring unit which comprises an acceleration sensor, a temperature and humidity meter and a light intensity meter, the environmental information acquiring unit is used for sensing environmental and climatic conditions of the moving target and acquiring tilt angle information of the first sensor nodes to determine operating states of the shock sensor and the image sensor, and an energy sensing unit executed by the processor, and used for sensing energy losses of the first sensor nodes; wherein, image quality is judged according to the environmental and climatic conditions acquired by the environmental information acquiring unit.

4. The wireless sensor network architecture based on multifunctional and compound sensors of claim 2, characterized in that, the second sensor nodes comprise a second communication unit, a second information processing unit and a second information merging unit which are executed by the processor;

wherein the second communication unit is used for receiving the primary target information transmitted by the plurality of first sensor nodes;

the second information processing unit is used for converging the primary target information, and performing target matching and association on the converged primary target information, and then correcting a vector state and a covariance for the associated information;

the second information merging unit is used for performing space-time merging on the corrected primary target information to form the secondary target information, and enabling the second communication unit to transmit the secondary target information to the computer;

wherein the first communication unit and the second communication unit have a function of automatically adjusting its own transmit power.

5. The wireless sensor network architecture based on multifunctional and compound sensors of claim 4, characterized in that, the second sensor nodes further comprise a second sensing unit executed by the processor, and used for sensing an energy loss of the second sensor node; and if the sensed energy loss of the second sensor node reaches a depletion threshold, the second sensing unit transmits an instruction for reselecting a second sensor node and enables the first sensor nodes to select a new second sensor node according to a predetermined selection rule.

6. The wireless sensor network architecture based on multifunctional and compound sensors of claim 1, characterized in that, the computer comprises a third communication unit, a third information merging unit, a third information processing unit, a command and control unit, and a storage unit which are executed by the processor;

wherein, the third communication unit is used for receiving the secondary target information transmitted by the plurality of sensing modules via the relay transmission module;

the third information merging unit is used for performing data merging on the received secondary target information;

the third information processing unit is used for performing situation analysis and situation prediction on the obtained secondary target information through merging, so as to acquire the advanced target information;

the command and control unit is used for sending a command to an operator according to the advanced target information; and the storage unit is used for storing the advanced target information.

7. The wireless sensor network architecture based on multifunctional and compound sensors of claim 1, characterized in that, the relay transmission module is further used for automatically adjusting its own transmit power.

8. The wireless sensor network architecture based on a multifunctional and compound sensors of claim 7, characterized in that, the wireless sensor network architecture based on multifunctional and compound sensors further comprises an energy conservation management module connected with the plurality of sensing modules and the relay transmission module, wherein the energy conservation management module is executed by the processor and used for managing operating modes of the plurality of sensing modules and the relay transmission module to optimize and configure operating states of the first sensor nodes and the second sensor node, and managing a transmit mode of the relay transmission module.

9. The wireless sensor network architecture based on multifunctional and compound sensors of claim 1, characterized in that, a mesh network structure is adopted between the plurality of first sensor nodes and the second sensor nodes.

* * * * *